United States Patent
Immel et al.

(10) Patent No.: US 9,898,098 B2
(45) Date of Patent: Feb. 20, 2018

(54) MAGNETIC BATTERY CHARGING SYSTEM FOR STYLUS

(71) Applicant: Microsoft Technology Licensing, LLC, Redmond, WA (US)

(72) Inventors: Eric Immel, Portland, OR (US); Gary Basey, Vancouver, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 96 days.

(21) Appl. No.: 14/318,384

(22) Filed: Jun. 27, 2014

(65) Prior Publication Data
US 2015/0378455 A1    Dec. 31, 2015

(51) Int. Cl.
| | |
|---|---|
| G06F 3/033 | (2013.01) |
| G06F 3/0354 | (2013.01) |
| G06F 3/038 | (2013.01) |
| G06F 3/039 | (2013.01) |
| H02J 7/00 | (2006.01) |

(52) U.S. Cl.
CPC .......... G06F 3/03545 (2013.01); G06F 3/039 (2013.01); G06F 3/0383 (2013.01); H02J 7/00 (2013.01); H02J 7/0042 (2013.01)

(58) Field of Classification Search
CPC .................................................. G06F 3/03545
USPC .................................................. 345/173–179
See application file for complete search history.

(56) References Cited

U.S. PATENT DOCUMENTS

| | | |
|---|---|---|
| 5,973,677 A | 10/1999 | Gibbons |
| 8,246,192 B2 | 8/2012 | Xu |
| 8,450,972 B2 | 5/2013 | Cacioppo et al. |
| 2012/0086391 A1 | 4/2012 | Smith |

(Continued)

FOREIGN PATENT DOCUMENTS

| | | |
|---|---|---|
| CN | 203149498 U | 8/2013 |
| EP | 2733586 A1 | 5/2014 |

OTHER PUBLICATIONS

"Anoto Digital Pen DP-201", Retrieved on: Apr. 30, 2014, Available at: https://www.google.co.in/url?sa=t&rct=j&q=&esrc=s&source=web&cd=4&cad=rja&uact=8&ved=0CEcQFjAD&url=http%3A%2F%2Fwww.paperdynamix.de%2Fen%2Fdownloads-en.html%3Ffile%3DtI__files%2FuserDownloads%2Fdownloadsite%2FHandbuecher%2FAnotoDigitalPenDP201_UsersGuide_EU.

(Continued)

*Primary Examiner* — Long D Pham
(74) *Attorney, Agent, or Firm* — Alleman Hall Creasman & Tuttle LLP

(57) ABSTRACT

Embodiments are disclosed for a stylus comprising an energy storage device for powering active functionality of the stylus, and a charging circuit electrically coupled to the energy storage device and configured to provide charging current for recharging the energy storage device. The stylus further comprises a magnetically-attractable element comprising ferromagnetic material disposed in a ring formation on an outer surface of the stylus, the magnetically-attractable element being electrically coupled to the charging circuit to form a terminal of the charging circuit, and the magnetically-attractable element being configured to be received on a dock via magnetic attraction to a permanent magnet of the dock to bring the stylus into a docked position in which the magnetically-attractable element contacts a charging contact (Continued)

of the dock to thereby cause the charging circuit to receive charging current from the dock.

19 Claims, 8 Drawing Sheets

(56) References Cited

U.S. PATENT DOCUMENTS

| | | | |
|---|---|---|---|
| 2013/0106723 A1* | 5/2013 | Bakken | G06F 3/03545 345/173 |
| 2013/0162589 A1* | 6/2013 | Lien | G06F 3/046 345/174 |
| 2014/0029183 A1 | 1/2014 | Ashcraft et al. | |
| 2014/0035870 A1 | 2/2014 | Yeh et al. | |
| 2014/0078116 A1* | 3/2014 | Mercea | G06F 1/266 345/179 |

OTHER PUBLICATIONS

ISA European Patent Office, International Search Report and Written Opinion Issued in Application No. PCT/US2015/037559, dated Aug. 24, 2015, WIPO, 9 pages.
IPEA European Patent Office, International Preliminary Report on Patentability issued in PCT Application No. PCT/US2015/037559, dated May 20, 2016, WIPO, 7 pages.
"Search Report Issued in European Patent Application No. 17186330.1", dated Oct. 5, 2017, 7 Pages.

* cited by examiner

MAGNETIC BATTERY CHARGING SYSTEM FOR STYLUS

BACKGROUND

Touch-sensitive display devices, track pads, writing tablets, graphics tablets/digitizers, and other electronic devices may accept input from an input device, such as a stylus. A stylus may be more suitable for precision tasks, such as drawing, writing, selecting icons, etc., than a finger or other blunt input mechanism. A stylus may include transmission/receiving devices and/or otherwise be capable of performing active functions to interact with a computing device. Such active functions may be powered by a rechargeable battery located within the stylus.

SUMMARY

A stylus may utilize a dock in order to recharge an internal battery and/or be housed within the dock for secure storage while not being used. Embodiments are disclosed for a stylus comprising an energy storage device for powering active functionality of the stylus, and a charging circuit electrically coupled to the energy storage device and configured to provide charging current for recharging the energy storage device. The stylus further comprises a magnetically-attractable element comprising ferromagnetic material disposed in a ring formation on an outer surface of the stylus, the magnetically-attractable element being electrically coupled to the charging circuit to form a terminal of the charging circuit, and the magnetically-attractable element being configured to be received on a dock via magnetic attraction to a permanent magnet of the dock to bring the stylus into a docked position in which the magnetically-attractable element contacts a charging contact of the dock to thereby cause the charging circuit to receive charging current from the dock.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, a stylus may provide active functionality that is powered by a rechargeable battery. A charging circuit within the stylus may provide charging current for recharging the battery via one or more terminals configured to contact charging contacts of an associated stylus charger. As a stylus may be easily misplaced due to the typical size and shape of the stylus (e.g., a thin, rod-like shape with at least one tapered end), the stylus charger may take the form of a dock that holds the stylus in a particular location during charging and/or while the stylus is not being used. In the examples described below, the stylus includes at least one terminal of the charging circuit that is formed from a deposit of ferromagnetic material on an exterior of the stylus body. Including a magnetically-attractable element that also serves as a charging terminal enables the terminal to be aligned to a charging contact of the dock and secured to the dock against gravitational pull and other forces via magnetic attraction to a permanent magnet of the dock.

Figure 1:
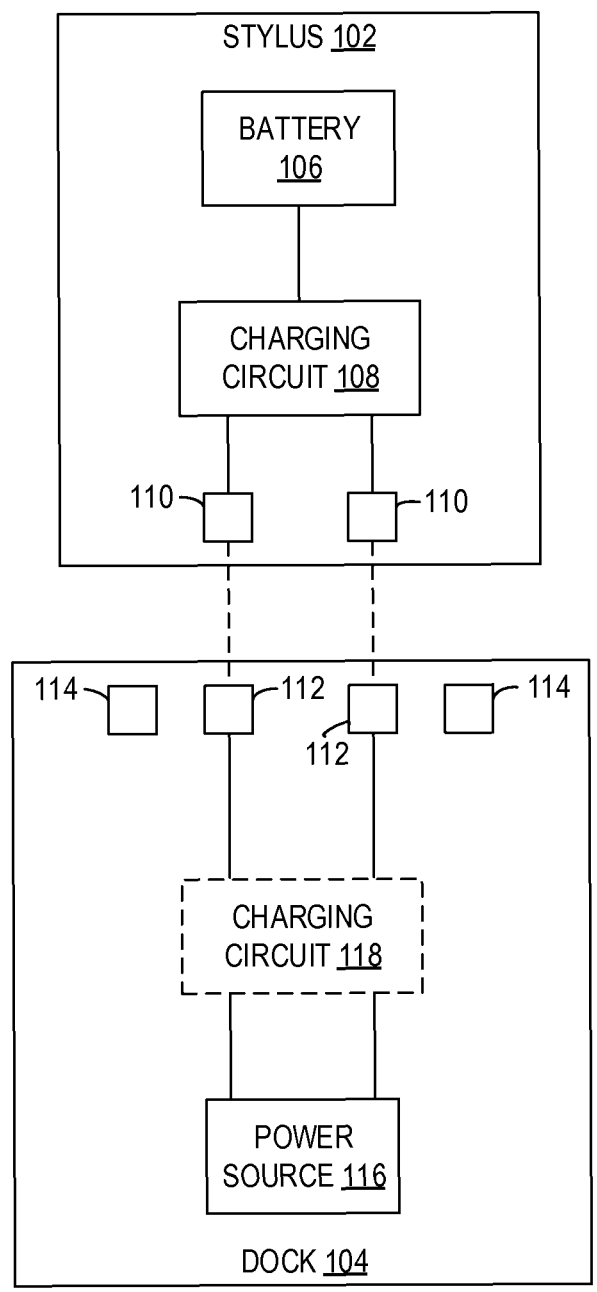
FIG. 1 schematically shows an example stylus charging system.

FIG. 1 schematically shows an example stylus charging system 100. Stylus charging system 100 may include a stylus 102 that is configured to contact and/or be supported in a dock 104. Stylus 102 may include a battery 106 or other energy storage device configured to power active functionality of the stylus. Battery 106 may provide power to electrical components of a processor or other logical device of the stylus, a storage device of the stylus, a sensor device of the stylus, a transmitter/receiver of the stylus, a light emitting device (e.g., a laser pointing mechanism), and/or any suitable electronic device(s) of the stylus that may be utilized to perform the active functionality. For example, stylus 102 may be configured to transmit location information, biometric data of a user of the stylus, and/or other suitable information to a computing device that accepts input from the stylus. Stylus 102 may additionally or alternatively include a vibration motor, indicator light(s), and/or other feedback mechanisms that may be powered by battery 106. It is to be understood that battery 106 may be any suitable type of rechargeable battery and may use any suitable chemical composition, including but not limited to lithium ion (e.g., lithium cobalt), lead-acid, nickel-cadmium (NiCd), nickel-metal hydride (NiMH), etc.

A charging circuit 108 may be electrically coupled to battery 106 and configured to provide charging current to battery 106. Charging circuit 108 may be configured to regulate current flow from one or more terminals 110 to battery 106. For example, charging circuit 108 may ensure that a steady flow of current is supplied to the battery, may control a charging time, and/or may provide any suitable regulation, alteration, and/or control of the charging of battery 106. Charging circuit 108 may also monitor parameters, such as voltage, temperature, etc., in order to provide intelligent control over the charging of battery 106.

Charging circuit 108 may include any suitable number of terminals. For example, two terminals 110 are illustrated in stylus 102 of FIG. 1. Terminals 110 may be formed by electrically-conductive material disposed on a surface of the stylus. In this way, the electrically-conductive material may come into face-sharing contact with one or more charging contacts 112 of dock 104 and thereby form a circuit via which charging current can be supplied to charge the stylus when in a docked position. One or more of the terminals 110 may be magnetically-attractable, including and/or being composed of a ferromagnetic material. For example, one or more of the terminals 110 may include plated or solid steel, iron, nickel, cobalt, any/or any suitable ferromagnetic metal or metal alloy. As described in more detail below, in some examples, one or more additional terminals 110 may be non-magnetically-attractable, including and/or being composed of non-ferromagnetic material. For example, one or more of the terminals 110 may include plated or solid brass, bronze, copper, gold, silver, and/or any suitable non-ferromagnetic material.

As described above, each of the terminals 110 may be brought into contact with a respective charging contact 112 of dock 104 when the stylus is in a docked position. Additionally, any magnetically-attractable terminals including ferromagnetic material (also referred to herein as ferromagnetic terminals) are attracted to one or more permanent magnets 114 disposed in or on dock 104. In the illustrated example, two permanent magnets are shown, however any suitable number of permanent magnets may be included in dock 104. Permanent magnets 114 may be completely enclosed within and/or covered by an outer housing of the dock or may be fully or partially exposed to a surface of the dock. For example, one or more of the permanent magnets 114 may be partially enclosed within a dock housing and protrude through an opening(s) in the dock housing toward and/or above an outer surface of dock 104 in some examples. In other examples, one or more of the permanent magnets 114 may be fully disposed on an outer surface of a dock body. Exposing a permanent magnet to an outer region of the dock may increase the strength of the magnetic attractive force provided by the permanent magnet attract a ferromagnetic terminal, while covering a surface of the permanent magnet and/or enclosing the permanent magnet in a dock housing may decrease wear and tear of the permanent magnet.

Charging contacts 112 may be electrically coupled to a power source 116 directly and/or via a charging circuit 118. Power source 116 may be any suitable source of electrical power and may be configured to provide charging current to/through charging contacts 112. For examples in which a charging circuit 118 is utilized, the charging circuit 118 may provide similar functionality to charging circuit 108 to regulate output from power source 116 that is provided to charging contacts 112.

Figure 2:
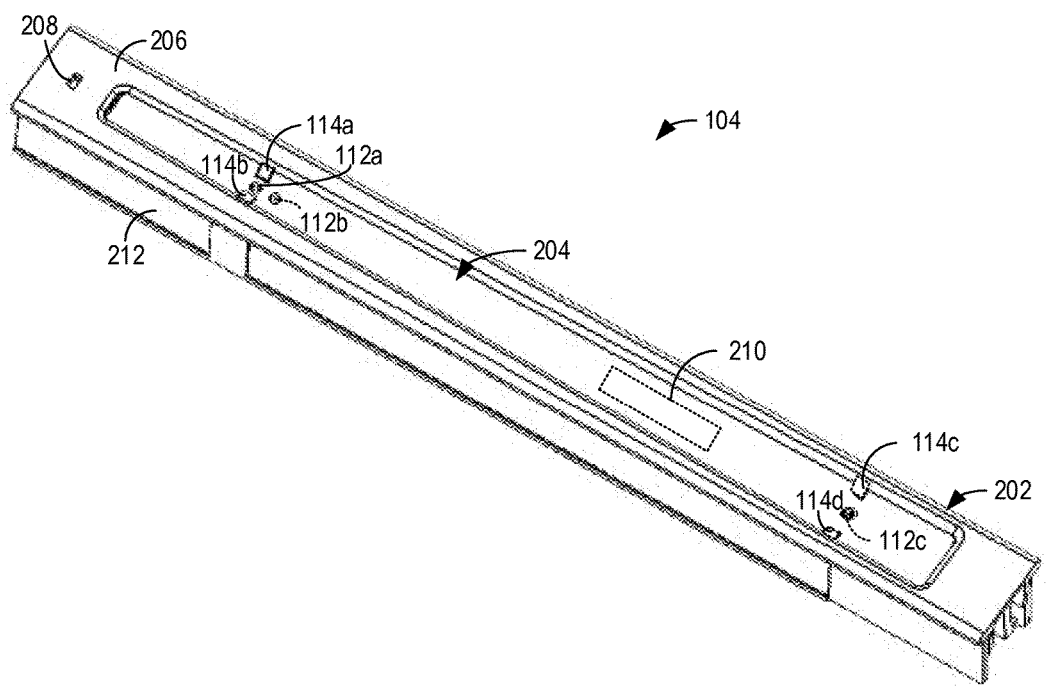
FIG. 2 shows an example dock of the stylus charging system illustrated in FIG. 1.

FIG. 2 shows an example appearance and structural configuration of dock 104 of FIG. 1. For example, dock 104 may have a substantially rectangular housing 202 with a depressed region 204 corresponding to a shape or form factor of a stylus. For example, depressed region 204 (also referred to herein as a well) may be depressed inward (e.g., toward internal components of the dock) relative to a front surface 206 of dock housing 202 and tapered more on one end (e.g., an end closest to charging contact 112a and optional charging contact 112b) than another end (e.g., an end closest to optional charging contact 112c). In this way, at least a portion of a stylus may fit inside of the well when the stylus is in a docked position. Front surface 206 may include an indicator light 208 and/or other feedback or sensing mechanism. For example, indicator light 208 may indicate a charging status of a stylus (e.g., not connected, charging, completed charging, etc.).

One or more charging contacts 112 and permanent magnets 114 may be disposed in depressed region 204 of dock 104. For example, at least a portion of charging contacts 112 and permanent magnets 114 may be configured to protrude through openings in a portion of dock housing 202 that is within depressed region 204. Charging contacts 112 may be spring-loaded, such that the contacts are biased to protrude out of the openings and may be pushed inward toward internal components of the dock when a downward force is applied to the contacts (e.g., when a stylus is brought into a docked position in which terminals of the stylus contact the charging contacts). As illustrated, a pair of permanent magnets 114a and 114b may be disposed on opposing sides of one of the charging contacts 112a, such that the charging contact is disposed between two permanent magnets. In this way, as described in more detail with respect to FIG. 7, a ferromagnetic terminal of a stylus may be guided, via magnetically attractive force of permanent magnets 114a and 114b, to alignment with a charging contact. The permanent magnets may be near, yet electrically isolated and/or spatially separated from charging contact 112a in order to reduce wear and tear on the permanent magnets and/or to enable material that is most appropriate for each functionality (e.g., magnetically attractive force and electrical conductivity) to be selected for the magnets and the contacts. In other words, the charging contacts may be made from materials that may be more electrically conductive than materials used to form a strong permanent magnet.

Additional permanent magnets, such as optional magnets 114c and 114d, and/or an additional optional charging contact 112c may be positioned at an opposite end of dock 104 in order to interact with another ferromagnetic element of the stylus to provide further alignment and security of the stylus to the dock. For example, a pair of permanent magnets 114c and 114d may be configured to attract an additional ferromagnetic terminal of the stylus and/or a battery of the stylus. When utilized to attract a ferromagnetic terminal of the stylus, optional charging contact 112c may be present, while optional charging contact 112b may be omitted from the dock. Alternatively, if utilized to attract a battery or other ferromagnetic element of the stylus that is not a terminal of a charging circuit, optional charging contact 112c may be omitted, while optional charging contact 112b may be included in the dock. Additionally or alternatively, permanent magnet 210 may be included in dock 104 in one or more of the above-described examples. Permanent magnet 210 may be configured and positioned to attract battery 106 of stylus 102.

Although illustrated as pairs of magnets on opposite sides of a depressed region, it is to be understood that permanent magnets 114 may be arranged in any suitable configuration for aligning and attracting a stylus toward a docked position. For example, a single permanent magnet may be disposed on either side of a charging contact, multiple permanent magnets may be disposed on either side of multiple charging contacts, one or more permanent magnets may be disposed on front surface 206 outside of the depressed region 204, etc. Additionally, permanent magnets 114 may have any suitable dimensions. For example, one or more permanent magnets may form a partial ring around a portion of the depressed region, and/or may have a suitable regular or irregular shape.

Figure 3:
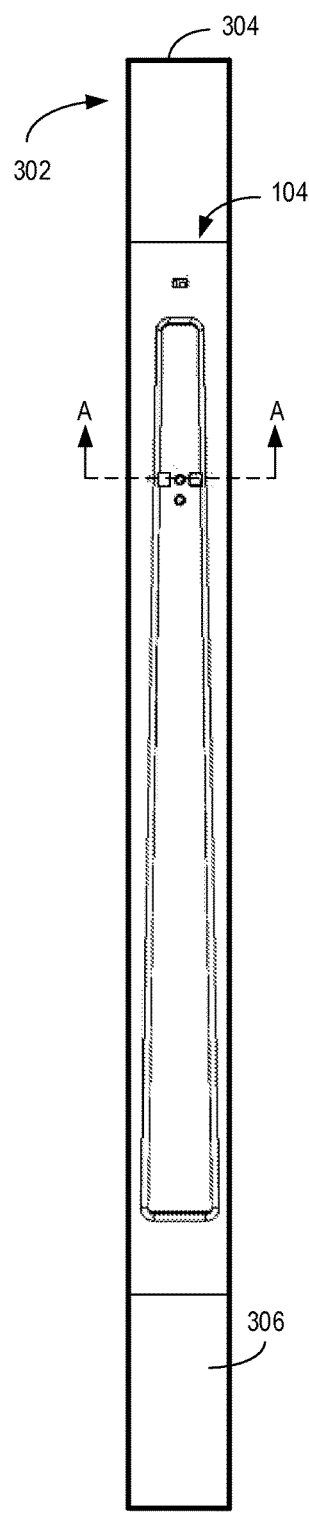
FIG. 3 shows an example display device and integrated dock configuration.

One or more side surfaces, such as side surface 212, may be configured to integrate with and/or otherwise attach to a display device in some examples. Turning now to FIG. 3, dock 104 is illustrated in relation to a display device 302. In the illustrated example, dock 104 is mounted vertically (e.g., a more tapered end of the well is positioned above a less tapered end of the well) to a side of display device 302. It is understood that dock 104 may be attached to and/or integrated into a bezel 304 of the display device 302. For example, dock 104 may be attached at a rear surface (opposite front surface 206 illustrated in FIG. 2) to the side of the display such that the dock extends from bezel 304 and/or integrated into the display such that the front surface 206 is flush with an outer surface 306 of bezel 304. Such an orientation of the dock is possible due to the ferromagnetic attractive force provided between permanent magnets 114 of dock 104 (as illustrated in FIGS. 1 and 2) and ferromagnetic terminals 110 of stylus 102 (as illustrated in FIG. 1), which is stronger than the force of gravity on a stylus in the docked position and powerful enough to both hold the stylus securely in place and provide a perceptive pull when the stylus nears the dock. In this way, a user may be very approximate in the motion used to place the stylus in the dock and still achieve a docking of the stylus. It is to be understood that dock 104 may be integrated and/or attached to display device 302 in any suitable orientation and/or position relative to the display device.

Figure 4:
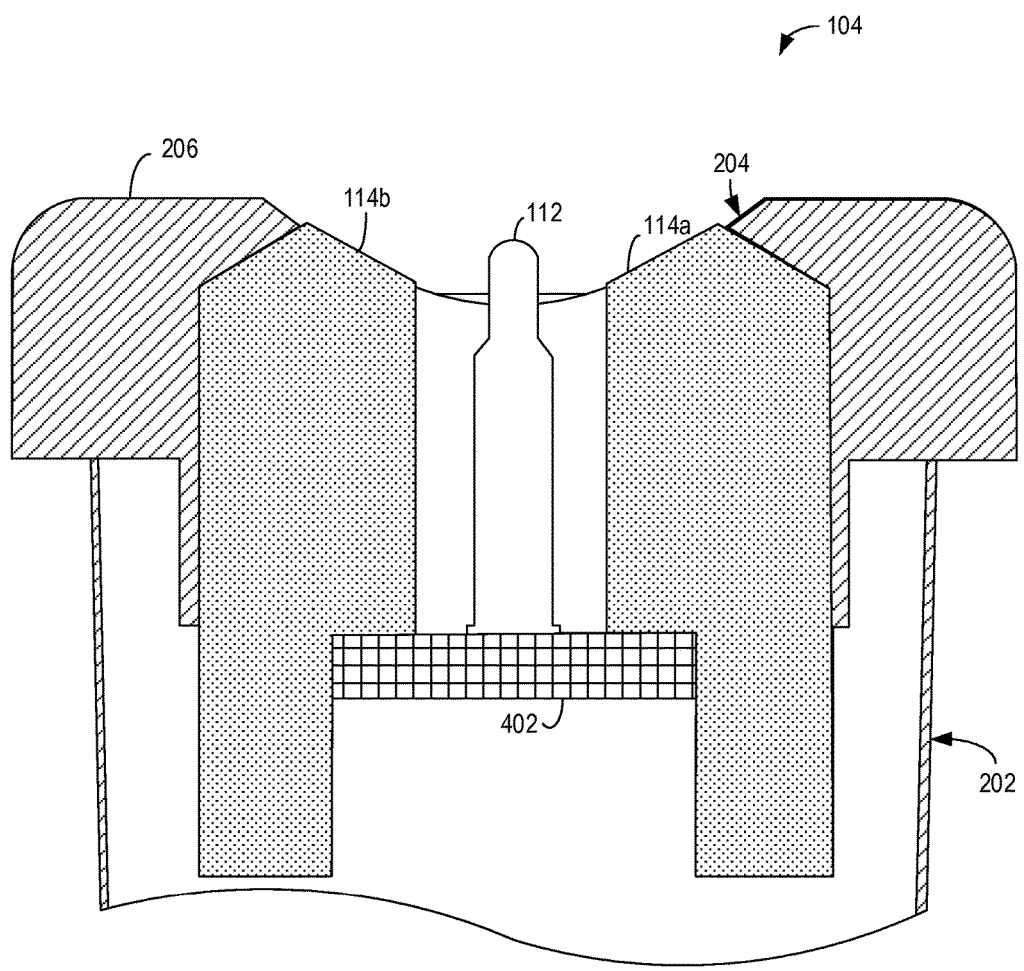
FIG. 4 shows a cross section of an example dock.

FIG. 4 shows a cross section of dock 104 taken alone line A-A of FIG. 3. The cross section of dock 104 further illustrates the concavity of depressed region 204 relative to front surface 206 of housing 202. The cross section of dock 104 also illustrates the exemplary protrusion of permanent magnets 114a and 114b and charging contact 112 through the housing of depressed region 204. Charging contact 112 may be mounted on a substrate, such as printed circuit board 402, which includes electrically conductive tracks and other suitable connectors to connect charging contact 112 to a charging circuit and/or power source of dock 104. It is to be understood that the size and shape of the elements, such as the permanent magnets and charging contacts, illustrated in FIG. 4 are representative and any suitable configuration of such elements may be used. For example, permanent magnets of dock 104 may be thin discs that are just thick enough to be partially housed in the dock housing and partially protrude through openings in the dock housing.

Figure 5:
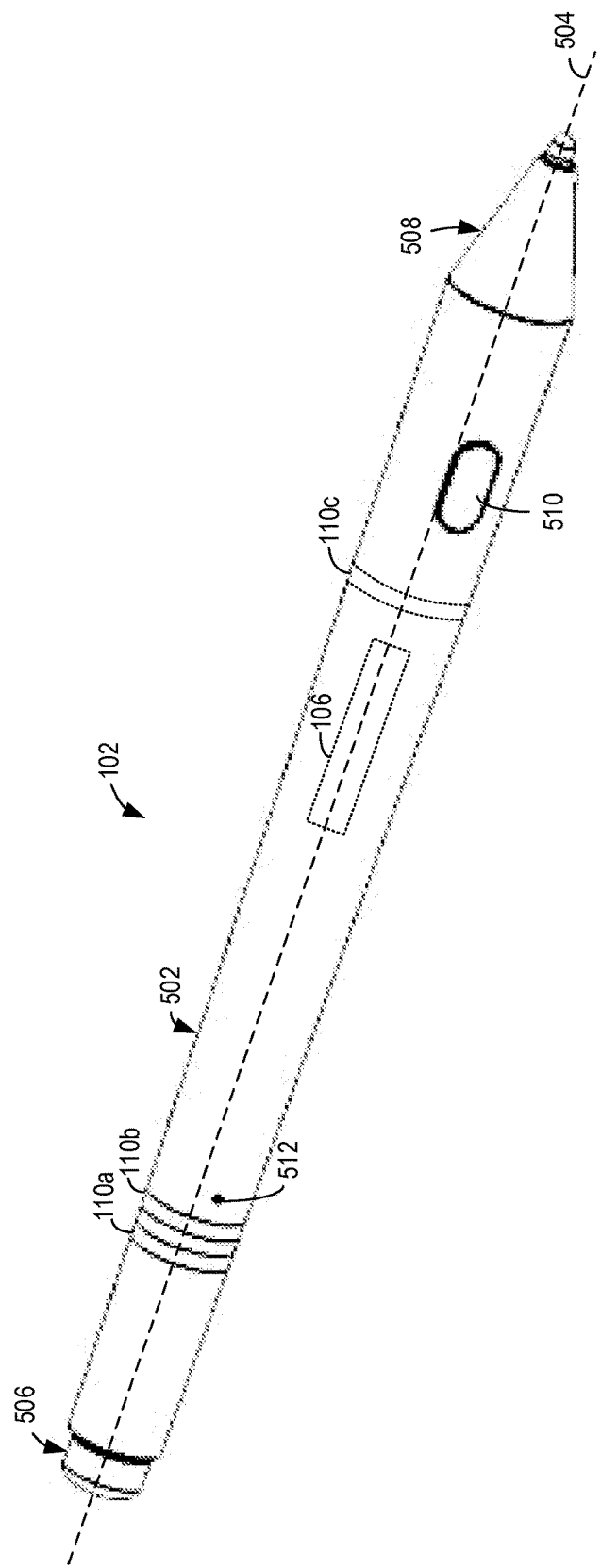
FIG. 5 shows an example stylus of the stylus charging system illustrated in FIG. 1.

FIG. 5 shows an example appearance and structure of stylus 102 of FIG. 1. As illustrated, terminals 110a and 110b may form a full or partial ring around a circumference of stylus housing 502. A terminal that forms a full ring around an entire circumference of the stylus may be utilized to enable easier docking of the stylus, as the stylus may be rotated around a longitudinal axis 504 of the stylus to any position and still make contact with a charging contact of a dock. Although a ring terminal is illustrated, it is to be understood that any suitable terminal configuration may be utilized on the stylus. For example, a magnetic force between a ferromagnetic terminal of a stylus and a permanent magnet of a dock may be increased in order to allow a terminal disposed only a portion of a circumference of the stylus housing to be pulled toward the permanent magnet even if the stylus is oriented such that the terminal faces away from the permanent magnet when nearing the dock.

As described above, at least one of the terminals 110 of stylus 102 may be ferromagnetic in order to be attracted to a permanent magnet of dock 104. In one example, terminal 110a may be ferromagnetic, while terminal 110b may be non-magnetically-attractable (e.g., non-ferromagnetic). Such an arrangement may enable the terminals to appropriately align to charging contacts 112 of dock 104, as described in more detail with respect to FIG. 7. The arrangement may also enable the terminals to be spaced relatively closely to one another without affecting alignment of the stylus, as terminal 110b will not be attracted to a permanent magnet of dock 104. By utilizing at least one ferromagnetic terminal, both magnetic alignment/security and charging functionality may be provided by a single ring, resulting in fewer total rings being included on a surface of the stylus. Such a feature may reduce cost and provide aesthetic benefits for the stylus.

In other examples, multiple ferromagnetic terminals may be utilized. In such examples, ferromagnetic terminals may be spaced from one another in order to ensure proper alignment. For example, terminal 110a and optional terminal 110c may be ferromagnetic. Since terminals 110a and 110c are spaced on opposing ends of the stylus, each terminal may only be attracted to one of the permanent magnets of a dock (or the permanent magnets in one region of the dock) when the stylus nears a docked position. For example, terminal 110a may be attracted to permanent magnets 114a and 114b of FIG. 2, while terminal 110c may be attracted to permanent magnets 114c and 114d of FIG. 2. The ferromagnetic terminals may be arranged symmetrically (e.g., terminal 110a may be spaced from an eraser end 506 by a same amount as terminal 110c is spaced from a writing end 508) in order to allow the stylus to be placed in a dock in any orientation. In other words, the symmetric arrangement of terminals of a stylus and associated magnets and charging contacts of a dock may utilized to enable the terminals to contact magnets and/or charging contacts on either end of the dock. When using multiple ferromagnetic terminals, such as terminals 110a and 110c, non-ferromagnetic terminals, such as terminal 110b, may be omitted from the stylus. It is to be understood that the arrangement and position of ferromagnetic and non-ferromagnetic terminals illustrated in FIG. 5 is exemplary, and any suitable orientation may be utilized.

Stylus 102 may have any suitable active functionality to provide multiple types of input to a computing system and/or to provide feedback to a user. For example, the stylus may include sensors that detect an orientation and/or point of contact of the stylus to determine whether an eraser end 506 or a writing end 508 is providing input (e.g., touches a surface). Providing input with the different ends of the stylus may enable different functions to be performed with the same strokes. For example, providing input via eraser end 506 may cause displayed features in a region of a graphical user interface to be removed, while providing input via writing end 508 may cause additional displayable features to be added to a graphical user interface. Performing a particular type of input, such as a tap or press, to eraser end 506 (or tapping/pressing the eraser end to a touch-sensitive input surface) may cause a command, such as undo, to be executed. Performing such an input to or with writing end 508 may cause a different command, such as a selection command, to be executed. In some examples, eraser end 506 and/or writing end 508 may include a button mechanism. Writing end 508 may be more tapered than eraser end 506 in order to provide an input mechanism with increased precision (e.g., that is able to contact a smaller area of a touch-sensitive input surface). Stylus 102 may also include a button 510 to provide additional functionality. For example, button 510 may be actuated to change an input state of the stylus, power on/off the stylus, provide selection/confirmation input, etc. Similarly to indicator light 208 of dock 104 in FIG. 2, indicator light 512 of stylus 102 may provide feedback regarding a state of the stylus (e.g., state of remaining charge/charging status of the battery, power status, etc.).

Figure 6:
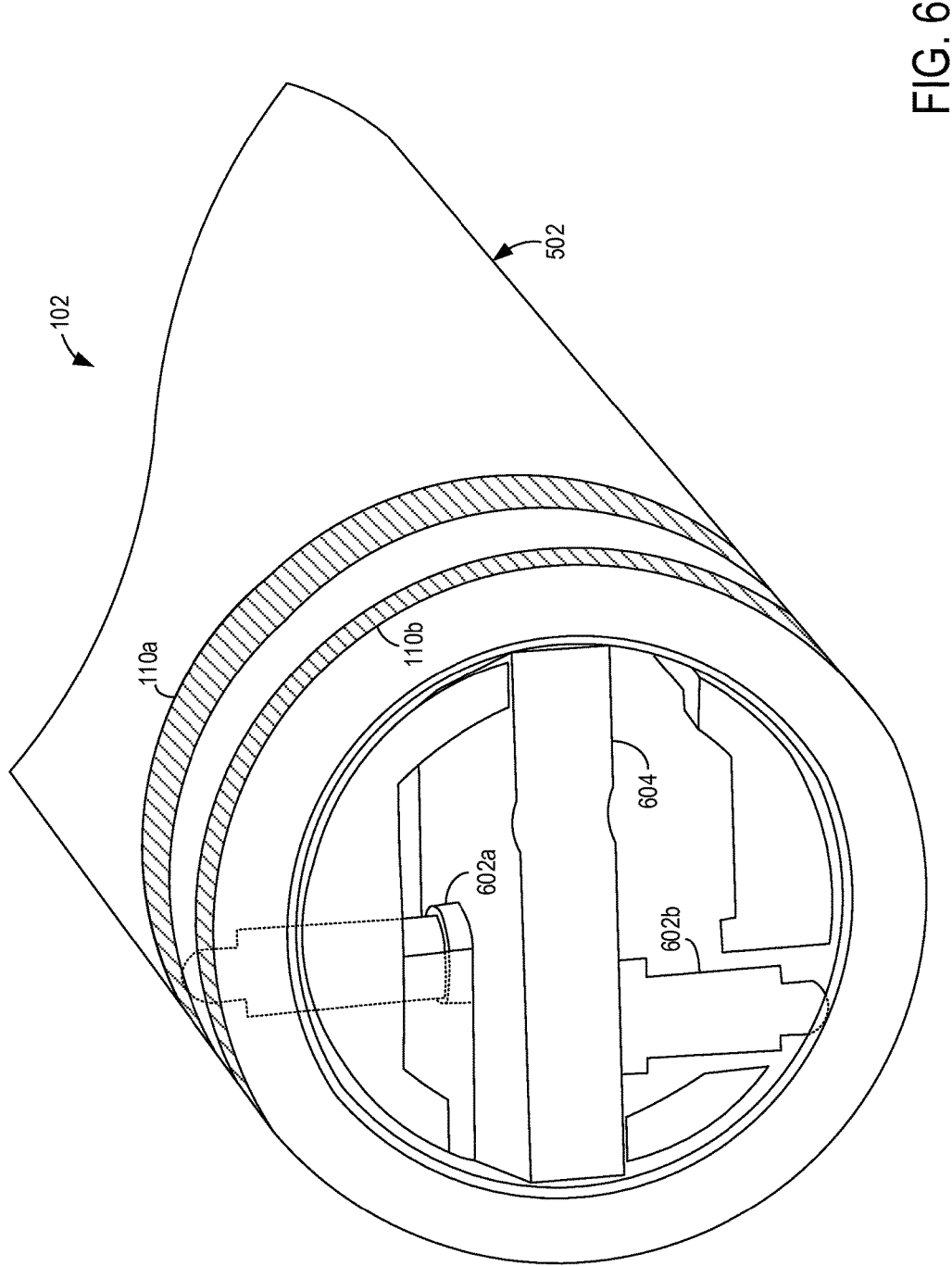
FIG. 6 shows a cross section of an example stylus.

FIG. 6 shows a cross section of stylus 102 through terminal 110b and along an axis perpendicular to longitudinal axis 504 of FIG. 5. As illustrated, both terminals 110a and 110b are electrically connected (e.g., via physical contact) to pins 602a and 602b, respectively. In this way, charging current may flow through respective pins 602a and 602b to a charging circuit of the stylus via electrically conductive tracks and/or other suitable connectors disposed on a substrate, such as printed circuit board 604. Pins 602a and 602b may be positioned on opposing sides of printed circuit board 604 in order to minimize interference while flowing charging current to the charging circuit.

Figure 7:
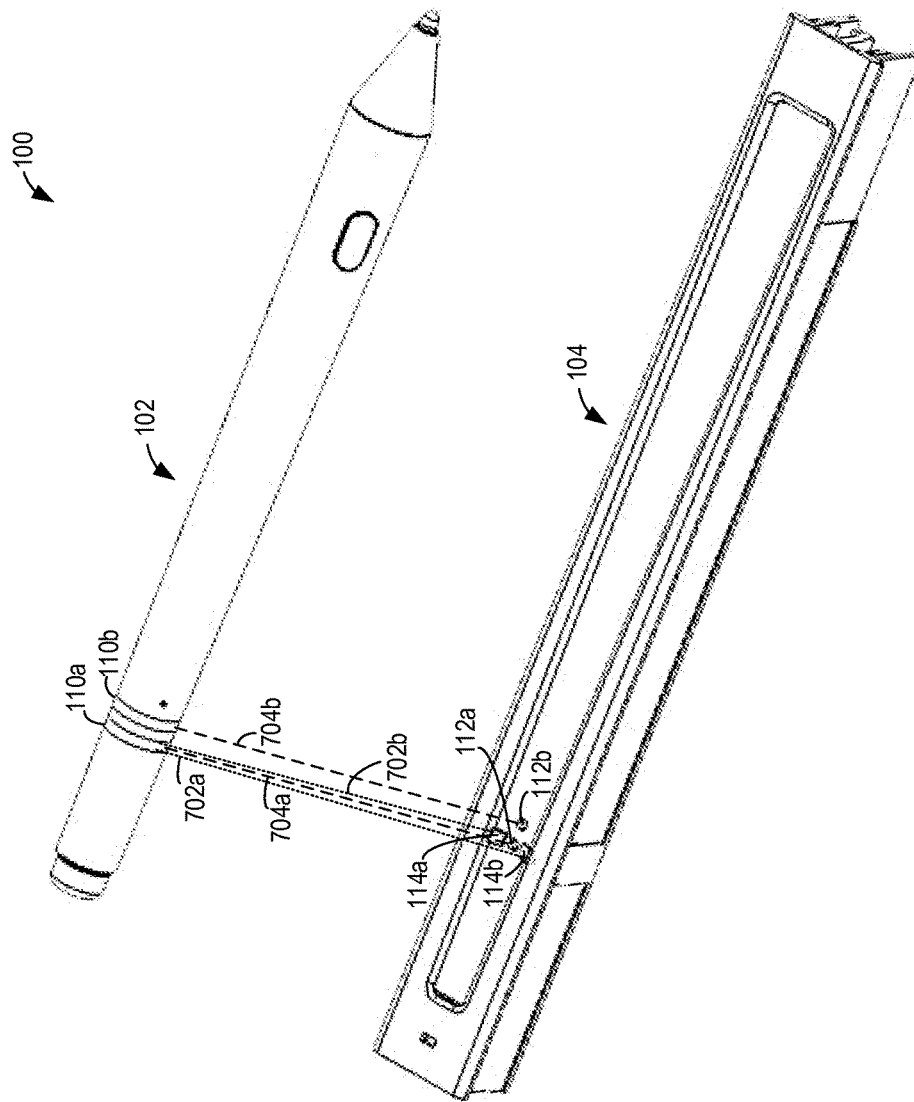
FIG. 7 shows an example electronic and magnetic relationship between a stylus and a dock of an example stylus charging system.

FIG. 7 shows an example electronic and magnetic relationship between a stylus and a dock of an example stylus charging system 100. For example, terminal 110a of stylus 102 may be a ferromagnetic terminal configured to be magnetically attracted to permanent magnets 114a and 114b via magnetic force 702a and 702b, respectively. The magnetic force between terminal 110a and permanent magnets 114a and 114b serve to urge the stylus into a docked position as stylus 102 nears dock 104. Due to the positioning of the permanent magnets on either side of a charging contact, upon being pulled into contact with the magnets, ferromagnetic terminal 110a will also contact charging contact 112a to provide the electrical connection illustrated by dashed line 704a. As the charging contact may be spring-loaded and biased to extend above the permanent magnets, the ferromagnetic terminal 110a will contact the charging contact before contacting the permanent magnets. The magnetic force between ferromagnetic terminal 110a and permanent magnets 114a and 114b is strong enough to overcome the bias of the spring-loaded charging contacts and cause the ferromagnetic terminal to depress the charging contacts to come into face-sharing contact with the permanent magnets. The bias of the spring-loaded charging contacts urges the contact toward the terminal of the stylus during docking, thereby ensuring secure uninterrupted electrical contact while the stylus is docked.

As described above with respect to FIG. 2, additional attractive forces may be provided using one or more additional permanent magnets on dock 104 and other ferromagnetic terminal on the stylus (e.g., terminal 110c of FIG. 5, battery 106, and/or another ferromagnetic element of stylus 102). Such additional magnetic attraction may be utilized for further alignment and/or to strengthen the magnetic force between the dock and the stylus as a whole and further secure the stylus to the dock while in the docked position.

Continuing with FIG. 7, a second charging contact 112b may be spaced from the permanent magnets and charging contact 112a (which is disposed between the permanent magnets) by a distance that is equal to the distance between terminals 110a and 110b. In this way, the magnetic force that brings terminal 110a into contact with permanent magnets 114a and 114b also aligns terminal 110b with charging contact 112b. Accordingly, an electrical connection between terminal 110b and charging contact 112b may be made, as represented by dashed line 704b.

Figure 8:
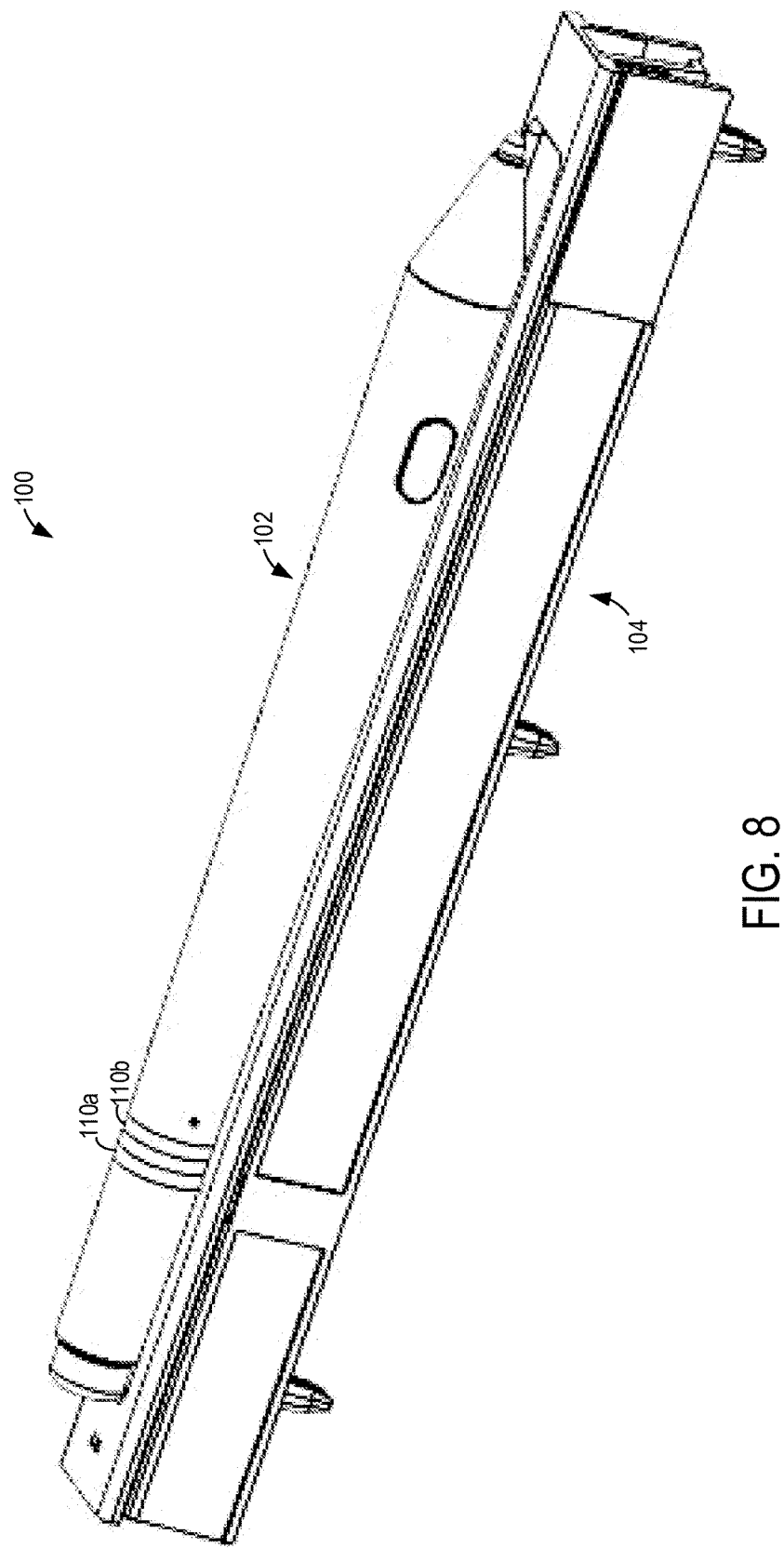
FIG. 8 shows an example docked position of a stylus within a dock of a stylus charging system.

FIG. 8 shows an example docked position of stylus 102 within dock 104 of a stylus charging system 100. As illustrated, stylus 102 is seated within a depressed region of dock 104 (described above in more detail with respect to FIG. 2). In this way, terminals 110 of stylus 102 are in electrical contact with respective charging contacts of dock 104 in the manner described above with respect to FIG. 7.

A stylus charging system that incorporates ferromagnetic charging terminals on a stylus as described above enables a system to provide the dual functionality of aligning/securing the stylus in a docked position and providing an electrical connection between the ferromagnetic charging terminals of the stylus and the charging contacts of the dock. Such ferromagnetic attraction may even enable the stylus to remain seated in the dock in a vertical orientation. Further, by providing permanent magnets on the dock that are near, yet electrically isolated from a charging contact of the dock reduces wear and tear on the permanent magnets and enables more appropriate materials to be used for each of the permanent magnets and the charging contacts.

In some embodiments, the methods and processes described herein may be tied to a computing system of one or more computing devices. In particular, such methods and processes may be implemented as a computer-application program or service, an application-programming interface (API), a library, and/or other computer-program product.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A stylus comprising:
an energy storage device for powering active functionality of the stylus;
a charging circuit electrically coupled to the energy storage device and configured to provide charging current for recharging the energy storage device; and
a ferromagnetic terminal formed from ferromagnetic material disposed on an outer surface of the stylus, the ferromagnetic terminal being electrically coupled to the charging circuit such that the ferromagnetic terminal contacts a charging contact of a power source to thereby create an electrically conductive path to enable charging current to flow from the charging contact of the power source, through the ferromagnetic terminal and the charging circuit to the energy storage device,
wherein the ferromagnetic terminal is configured to be received on a dock of the power source via magnetic attraction to a permanent magnet of the dock to bring the stylus into a docked position in which the ferromagnetic terminal contacts the charging contact of the power source to thereby cause the charging circuit to receive charging current from the power source.

2. The stylus of claim 1, wherein the ferromagnetic terminal is a first terminal, the stylus further comprising a second, non-ferromagnetic terminal formed from non-ferromagnetic material disposed on the outer surface of the stylus, the second, non-ferromagnetic terminal electrically coupled to the charging circuit and configured to contact a second charging contact of the power source to thereby cause the charging circuit to receive charging current from the power source.

3. The stylus of claim 1, wherein the ferromagnetic terminal is a first terminal, the stylus further comprising a second terminal formed from ferromagnetic material disposed on the outer surface of the stylus, the second, ferromagnetic terminal electrically coupled to the charging circuit and configured to be received on the dock via magnetic attraction to a second permanent magnet of the dock and contact a second charging contact of the power source to thereby cause the charging circuit to receive charging current from the power source.

4. The stylus of claim 3, wherein the first ferromagnetic terminal is positioned on an opposite end of the stylus from the second ferromagnetic terminal.

5. The stylus of claim 3, wherein a distance from the first ferromagnetic terminal to a first end of the stylus is equal to a distance from the second ferromagnetic terminal to a second end of the stylus to provide a symmetric arrangement of the first ferromagnetic terminal and the second ferromagnetic terminal on the stylus.

6. The stylus of claim 1, wherein the energy storage device includes ferromagnetic material configured to be received on the dock via magnetic attraction to a second permanent magnet of the dock, the energy storage device being disposed on an opposing end of the stylus from the ferromagnetic terminal.

7. The stylus charging system of claim 6, wherein the charging contact and the permanent magnet extend through openings in a housing of the dock.

8. The stylus charging system of claim 7, wherein the charging contact is spring-loaded and biased to extend further from the housing of the dock than the permanent magnet of the dock.

9. The stylus charging system of claim 6, wherein the dock further includes a well having a shape corresponding to the stylus, the well being tapered on a first end in which the permanent magnet and charging contact are disposed relative to a second end.

10. The stylus charging system of claim 6, wherein the dock is integrated with a display device and vertically oriented on the display device.

11. The stylus charging system of claim 6, wherein the charging contact is electrically coupled to the power source via a second charging circuit housed in the dock.

12. A stylus charging system comprising:
a stylus including:
an energy storage device for powering active functionality of the stylus,
a charging circuit electrically coupled to the energy storage device and configured to provide charging current for recharging the energy storage device,
a first ferromagnetic terminal formed from ferromagnetic material disposed on an outer surface of the stylus and electrically coupled to the charging circuit, and
a second terminal disposed on the outer surface of the stylus and electrically coupled to the charging circuit; and
a stylus dock including:
a permanent magnet configured to attract the first ferromagnetic terminal of the stylus, and
a charging contact electrically coupled to a power source and electrically isolated from the permanent magnet, the charging contact configured to physically contact at least one of the first ferromagnetic terminal and the second terminal when the stylus is in a docked position, when the first ferromagnetic terminal is in physical contact with the charging contact an electrically conductive path is created to enable charging current to flow from the power source, through the charging contact, through the ferromagnetic terminal and the charging circuit to the energy storage device of the stylus, and when the second terminal is in physical contact with the charging contact an electrically conductive path is created to enable charging current to flow from the power source, through the charging contact, through the second terminal and the charging circuit to the energy storage device of the stylus.

13. The stylus charging system of claim 12, wherein the second terminal is formed from non-ferromagnetic material.

14. The stylus charging system of claim 13, wherein the first ferromagnetic terminal is formed from ferromagnetic material disposed in a ring around an entire circumference of the stylus and the second terminal is formed from non-ferromagnetic material disposed in a ring around the entire circumference of the stylus.

15. The stylus charging system of claim 12, wherein the permanent magnet configured to attract the first ferromagnetic terminal of the stylus includes a first permanent magnet, the dock further including a second permanent magnet, and wherein the first permanent magnet and the second permanent magnet are disposed on opposing sides of the charging contact from one another.

16. The stylus charging system of claim 15, the dock further comprising a third permanent magnet configured and positioned so as to magnetically attract and align with the energy storage device of the stylus when the stylus is in the docked position.

17. The stylus charging system of claim 15, the dock further comprising a second charging contact, a third permanent magnet, and a fourth permanent magnet, wherein the second terminal of the stylus is formed from ferromagnetic material disposed on the outer surface of the stylus, and wherein the third permanent magnet and the fourth permanent magnet are disposed on opposing sides of the second charging contact and configured to attract the second terminal of the stylus.

18. A stylus comprising:
an energy storage device for powering active functionality of the stylus;
a charging circuit electrically coupled to the energy storage device and configured to provide charging current for recharging the energy storage device;
a ferromagnetic terminal formed from ferromagnetic material disposed in a first ring on an outer surface of the stylus, the ferromagnetic terminal being electrically coupled to the charging circuit, and the ferromagnetic terminal being configured to be received on a dock via magnetic attraction to a permanent magnet of the dock to bring the stylus into a docked position in which the ferromagnetic terminal contacts a charging contact of the dock to thereby cause the charging circuit to receive charging current from the dock; and
a non-magnetic terminal formed from non- ferromagnetic material disposed in a second ring on the outer surface of the stylus, the non- magnetically terminal being electrically coupled to the charging circuit.

19. The stylus of claim 18, wherein the stylus further comprising a magnetically-attractable element disposed on an opposing end of the stylus from the ferromagnetic terminal and the non-magnetic terminal and configured to be received on the dock via magnetic attraction to a second permanent magnet of the dock.

* * * * *